United States Patent [19]

Welkowsky

[11] 4,071,648

[45] Jan. 31, 1978

[54] ELECTRON RADIOGRAPH RECEPTOR

[75] Inventor: Murray Samuel Welkowsky, Chatsworth, Calif.

[73] Assignee: Xonics, Inc., Van Nuys, Calif.

[21] Appl. No.: 679,067

[22] Filed: Apr. 21, 1976

Related U.S. Application Data

[63] Continuation-in-part of Ser. No. 532,053, Dec. 12, 1974, abandoned, which is a continuation-in-part of Ser. No. 398,484, Sept. 18, 1973, abandoned, which is a continuation-in-part of Ser. No. 362,430, May 21, 1973, abandoned.

[51] Int. Cl.² .................. B32B 7/02; G03G 13/26; G03G 15/00
[52] U.S. Cl. .................. 428/212; 250/315 A; 428/213; 428/333; 428/339; 428/412; 428/458; 428/461; 428/480; 428/483; 428/516; 428/520
[58] Field of Search .............. 428/213, 334, 335, 336, 428/412, 480, 481, 517, 518, 922, 408, 483, 520, 29, 38, 246, 339, 409, 458, 461, 333, 516; 250/315 A; 96/1 R, 1 PC, 1.5 N, 1.1

[56] References Cited

U.S. PATENT DOCUMENTS

| | | | |
|---|---|---|---|
| 2,901,348 | 8/1959 | Dessauer et al. | 96/1.5 N |
| 2,952,656 | 9/1960 | Zomlefer | 260/42.46 |
| 2,973,292 | 2/1961 | Yanko et al. | 428/523 |
| 3,206,307 | 9/1965 | Ludwig | 96/1 R |
| 3,258,336 | 6/1966 | Ewing | 96/1.1 |
| 3,278,366 | 10/1966 | Schiele | 340/173 R |
| 3,320,115 | 5/1967 | Reid et al. | 428/516 |
| 3,322,539 | 5/1967 | Redington | 96/1.1 |
| 3,603,790 | 9/1971 | Cleare | 250/468 |
| 3,630,826 | 12/1971 | Rose et al. | 428/424 |
| 3,631,514 | 12/1971 | Lee et al. | 346/135 |
| 3,774,029 | 11/1973 | Muntz etal. | 250/315 A |
| 3,849,188 | 11/1974 | Suzuki et al. | 428/412 |
| 3,854,942 | 12/1974 | Akman | 96/1.2 |
| 3,867,143 | 2/1975 | Tanaka | 96/1.5 N |
| 3,914,609 | 10/1975 | Jeromin | 96/1 R |
| 3,920,453 | 11/1975 | Gasner | 96/1.5 N |
| 3,932,751 | 1/1976 | Verhille | 250/315 A |
| 3,945,822 | 3/1976 | Verhille | 250/315 A |
| 3,953,207 | 4/1976 | Horgan | 96/1 PC |
| 3,975,635 | 8/1976 | Lennon | 250/315 A |

*Primary Examiner*—J.C. Cannon
*Attorney, Agent, or Firm*—Harris, Kern, Wallen & Tinsley

[57] ABSTRACT

A receptor sheet for use with an electronradiography system and having a relatively thick core layer bonded between a relatively thin image carrier layer and a relatively thin antistatic conducting layer.

18 Claims, 1 Drawing Figure

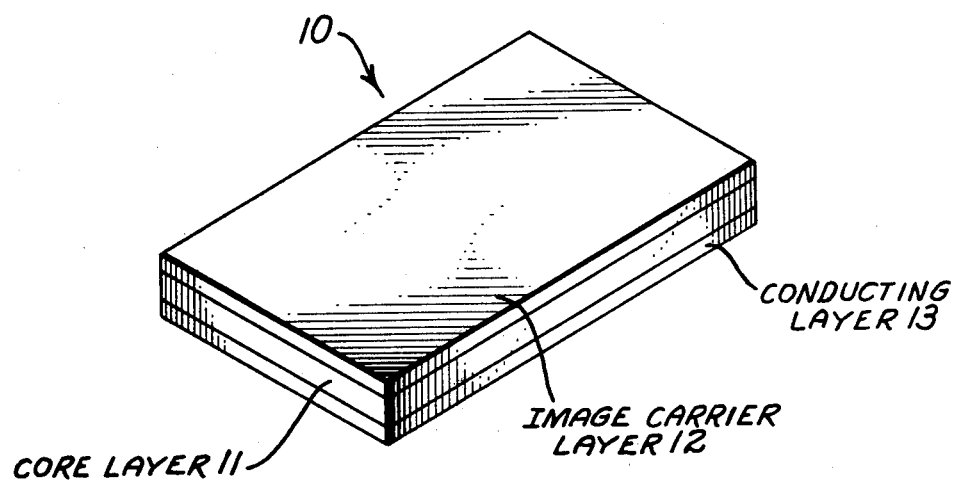

ELECTRON RADIOGRAPH RECEPTOR

This application is a continuation-in-part of copending application Ser. No. 532,053, filed Dec. 12, 1974, which was a continuation-in-part of the copending application Ser. No. 398,484, filed Sept. 18, 1973, which was a continuation-in-part of the copending application Ser. No. 362,430, filed May 21, 1973, all entitled ELECTRON RADIOGRAPH RECEPTOR and now abandoned.

This invention relates to a new and improved dielectric receptor sheet of the type used in electronradiography systems. A typical system which provides for the creation of X-ray images is described in the Muntz et al U.S. Pat. No. 3,774,029, entitled RADIOGRAPHIC SYSTEMS WITH XEROGRAPHIC PRINTING. In such a system, an X-ray opaque gas at high pressure is utilized between electrodes in an imaging chamber to produce a photoelectric current within that chamber as a function of X-rays entering the chamber. The current is collected on a receptor sheet placed on one of the electrodes, resulting in a latent electrostatic image on the sheet. This image is then made visible by developing and fixing, following conventional xerographic techniques.

There are several characteristics which the receptor sheet in an electronradiographic system should have. First, the material of the receptor exposed to the latent image charge should have sufficient resistivity to hold that charge without diffusion along the receptor surface as would occur if the material were electrically conductive, since diffusion results in blurring of the image. Secondly, one surface of the receptor should be conducting. This conducting surface allows the induced charge in the electrode to transfer to the back of the receptor, thus preventing electrical breakdown from the electrode to the charged receptor as the receptor is removed from the imaging chamber. Thirdly, the surface of the receptor which accepts the image charge should be such as to permit strong bonding of the toner to that surface. Finally, the receptor should be of sufficient rigidity to allow ease of handling by radiologists, while also being transparent for viewing the resultant image on light boxes.

In the past, a plastic dielectric sheet has been used as the receptor, e.g., polyester such as Mylar. However this type of material has only the first and last of the characteristics discussed above. Coatings must be applied to such plastic sheets to obtain a conducting surface and to obtain a surface which causes the toner to adhere strongly. An aluminum backed polyester sheet has been suggested as a receptor. However this material scratches easily and does not stretch, the latter being a requirement of some importance in spherical imaging chambers. Several antistatic agents have been utilized as a conductive coating, but these are tacky and humidity sensitive and require interleaving between the receptor sheets.

The present invention is directed to a new and improved multilayer receptor sheet which has all of the characteristics discussed above and which permits optimum fixing of the toner by one of the presently preferred methods, namely heat fixing, lamination, or overcoating with a soluble resin. The receptor sheet of the present invention comprises a relatively thick transparent dielectric plastic core layer bonded between a relatively thin dielectric image carrier layer and an antistatic conducting layer.

Accordingly, it is an object of the present invention to provide such a new and improved receptor sheet for an electronradiogram. Other objects, advantages, features and results will more fully appear in the course of the following description.

The single FIGURE of the drawing is a perspective view of a receptor sheet incorporating the presently preferred embodiment of the invention, with the thickness exaggerated for illustrative purposes.

Referring to the FIGURE, the receptor sheet 10 has a core layer 11 bonded between an image carrier layer 12 and a conducting layer 13. The core layer 11 is formed of a relatively thick transparent dielectric plastic preferably in the range of 5 to 10 mils thick and typically about 7 mils thick. The image carrier layer 12 is formed of a relatively thin dielectric plastic in the order of 1 mil thick. The conducting layer 13 is an antistatic material. The core layer 11 serves as the primary support for the receptor and has the rigidity to allow ease of handling of the finished picture while at the same time being highly transparent for ease of viewing, with the core layer preferably being about 5 to 15 times as thick as the carrier layer.

The conducting layer 13 may be transparent and fixed to the core layer 11, or may be opaque and separable from the core layer. When fixed to the core layer, the conducting layer should be relatively thin, typically less than ½ mil thick. A separable conducting layer, either opaque or transparent, may be thicker, typically in the range of 1-5 mils thick.

The core layer 11 may be a polyester plastic or a polycarbonate plastic selected for its relative stiffness and transparency. The polycarbonate plastic is clearer than the polyester plastic but is more flexible, and the polyester plastic is preferred. Mylar and Lexan are examples of suitable polyester and polycarbonate plastics, respectively; of course, the other polyester and polycarbonate plastics are equally suitable.

The image carrier layer 12 is selected for excellent dielectric properties, i.e., a resistivity of at least $10^{14}$ ohms per square unit of area, hereinafter referred to as ohms per square, and good bonding to the toner used in developing the latent electrostatic image. The image carrier layer preferably should be non-tacky at room temperatures, optically clear, flexible, insoluble in toner solution, and hard - to provide good scratch resistance for the developed and fixed image (such as measured at $\geq 20$ g scratch resistance using ASTM D-2197-68, Method I, incorporating a sapphire needly). Prior to fixing the toner, the image carrier layer should be softened, permitting the toner to be encapsulated or forced into the carrier during the fixing process without spreading of the toner. In a typical fixing process, the receptor and toner are heated and pressure is applied, forcing the toner into the softened plastic. When the plastic cools and hardens the toner remains encapsulated, providing excellent toner adhesion without the formation of separation or cracks between the toner and the plastic. For this process the layer 12 should soften at a temperature lower than that at which the toner softens and lower than at which the core layer softens. In an alternative process, sometimes referred to as vapor fusing, a solvent is used to soften the carrier layer prior to the application of pressure for forcing the toner into the carrier. If the carrier layer material is wetted by the toner material, then the application of pressure is not always required. Encapsulation of the toner will occur due to surface wetting and surface tension effects. Chlorinated hydrocarbons are used in vapor fusing and the layer 12 should be capable of being softened by the vapor while the core is substantially unaffected. In overcoating, a resin such as an acrylic or a vinyl chloride is applied out of solution (preferably water-based) as a thin-layer over the toned image. When dry, this layer is typically less than ½ mil thick. For overcoating, the carrier layer must provide strong adhesive bonding to the overcoat material.

A polyethylene plastic such as is used for the prior art receptor sheet is preferred for the image carrier layer 12. Alternatively, polystyrene, polyvinylchloride acetate, polyester adhesive, amorphous polyester layers and epoxy resins may be utilized. Polystyrene has properties similar to that of polyethylene but is somewhat more brittle. Polyvinylchloride acetate and polyester adhesive have lower melting points than the polyester and polycarbonate preferred for the core layer 11.

In an alternative fixing process, another plastic sheet is laminated onto the receptor sheet with the toner thereon. In this type of fixing, the quality of the resultant radiogram is a function of the bonding of the additional plastic sheet to the receptor sheet, with polyamide resin (e.g. Versamid by General Mills) ordinarily being used as a coating on the laminating sheet, for compatibility with the toner. With polyethylene plastic or suitable surface pretreatments used as the image carrier layer 12, an excellent bond is obtained between the laminating sheet and the toned receptor sheet.

The conducting layer 13 includes an antistatic agent which provides electrical conductivity along the layer. There are two types of electrodes with which the receptor sheet will be used. One electrode configuration, sometimes referred to as a virtual electrode, has a dielectric at the surface contacting the receptor sheet conducting layer. For use with this type of electrode, the layer 13 preferably will have a resistivity in the order of about $10^8$ to about $10^{12}$ ohms per square. Resistivities lower than about $10^8$ ohms per square tend to electrically short out the electrode against which the conducting layer rests, and resistivities greater than about $10^{12}$ will not permit induced charge transfer to the conducting layer from the electrode. In the other configuration, the electrode has a metal surface contacting the receptor sheet. Fo use with this type of electrode, the resistivity of the layer 13 may be considerably lower without adversely affecting performance, hence the preferred range is in the order of about $10^1$ to about $10^{12}$ ohms per square. One type of developing system used to visualize the latent image made with either of the above electrode configurations requires a conducting layer with a maximum surface resistivity on the order of $10^9$ ohms per square, due to insufficient, continuous mechanical contact between the conducting layer and the development electrode. Hence, for use with the metal electrode described in the preceding paragraph, the preferred range of layer 13 is in the order of about $10^1$ to about $10^9$ ohms per square.

There are a variety of antistatic agents available and a large number are listed in Modern Plastics Encyclopedia 1972–1973 pages 446–449. The layer 13 may be a coating of film of an antistatic agent on the core layer, or may be in the form of a plastic sheet, such as polyethylene plastic, with the antistatic agent substantially uniformly distributed throughout the bulk of the layer. The antistatic plastic sheets are available from various sources and one typical suitable material is antistatic polyethylene available from Richmond Corp. Some antistatic agents become tacky under adverse conditions of humidity and/or temperature, requiring control of the environment during storage and use of the receptor sheet and the use of interleaving. A preferred type of antistatic agent is the vapor deposition of a thin (in the order of several hundred angstroms) continuous layer of metal, such as nickel. When overcoated with another thin layer (typically 1000 angstroms) of an antireflective coating, such a combination retains significant optical transparency, on the order of 80–85%, while yielding surface resistivities of $10^3$ – $10^5$ ohms per square. Furthermore, the layer is humidity insensitive.

The conducting layer 13 may be permanently fixed to the core layer 11 or may be separable from the core layer, with separation occurring after image formation and after developing and fixing. When the conducting layer is a permanent part of the receptor, it must of course be transparent. However there is no such transparency requirements when the conducting layer is separated from the remainder of the receptor after image formation and prior to viewing. The specific examples for the conducting layer given in the preceding paragraph provide a transparent conducting layer. Conducting paper and carbon impregnated plastics or papers such as carbon impregnated polyethylene or polyamide are suitable for an opaque conducting layer. Conducting papers are available from Kimberly-Clark and the R. W. Paper Co. of Longview, Washington, and may be sold under the trade designation of "glassine" and "bleached label backing paper." Carbon impregnated plastics are available from 3M, or can be formulated by impregnating carbon black with polyamide resin (e.g. Versalon from General Mills) in the appropriate solution. Carbon impregnated papers are available from Riegel, Inc.

The receptor sheet 10 comprising the three layers 11, 12, and 13 may be manufactured by laminating three individual sheets bonded with a transparent adhesive, typically a polyester adhesive. In an alternative method of production, the outer layers 12 and 13 may be applied as liquid coatings onto a sheet of the core layer 11, following conventional plastic production techniques. A separable conducting layer may be laminated to the core layer by a peelable adhesive which should be applied in a uniform layer. Desirably, the adhesive should have much greater affinity for the conducting layer than for the core layer so that upon separation, the adhesive will remain with the conducting layer. Typically polyethylene or EVA (ethylene-vinyl acetate) extruded onto the conducting paper layers will serve as the adhesive, while slip agents such as silicone oils can be blended into the plastic conducting layers to provide peelability.

In use, the receptor 10 is placed in the imaging chamber, with the layer 13 on one of the electrodes. During the X-ray exposure, an electrostatic charge image is produced at the surface of the layer 12. The receptor 10 is then removed from the imaging chamber, ready for visual image developing and fixing.

I claim:

1. A three layer receptor sheet for positioning at an electrode of an imaging chamber to produce an electronradiogram, consisting essentially of an optically transparent dielectric plastic core layer of substantially constant resistivity arranged in contiguous relation between an optically transparent dielectric plastic image carrier layer and an antistatic electrical conducting layer, said image carrier layer having a substantially constant resistivity of at least $10^{14}$ ohms per square unit of area for receiving on its exposed face an electrostatic image of charges generated externally of the sheet and retaining said charge image while in contact with said core layer and exposed to light, said antistatic electrical conducting layer having a substantially constant resistivity in the range of about $10^1$ to about $10^{12}$ ohms per square unit of area.

2. A receptor sheet as defined in claim 1 wherein said core layer is a polyester or polycarbonate film.

3. A receptor sheet as defined in claim 1 wherein said carrier layer is a polyethylene, polystyrene, polyvinylchloride acetate, polyester adhesive, amorphous polyester or epoxy resin film.

4. A receptor sheet as defined in claim 1 wherein said conducting layer is an antistatic agent film.

5. A receptor sheet as defined in claim 1 wherein said conducting layer is a plastic film with an antistatic agent substantially uniformly distributed therethrough.

6. A receptor sheet as defined in claim 1 wherein said conducting layer is an antistatic polyethylene film.

7. A receptor sheet as defined in claim 1 wherein said core layer is about 5 to 15 times as thick as said carrier layer and as said conducting layer.

8. A receptor sheet as defined in claim 1 wherein said core layer is a polyester film, said carrier layer is a polyethylene film, and said conducting layer is an antistatic agent film.

9. A receptor sheet as defined in claim 1 wherein said conducting layer is transparent.

10. A receptor sheet as defined in claim 1 wherein said conducting layer is opaque.

11. A receptor sheet as defined in claim 1 wherein said conducting layer is permanently fixed to said core layer.

12. A receptor sheet as defined in claim 1 wherein said conducting layer is separable from said core layer.

13. A receptor sheet as defined in claim 1 wherein said conducting layer is a carbon impregnated plastic.

14. A receptor sheet as defined in claim 1 wherein said conducting layer is a carbon impregnated polyethylene.

15. A receptor sheet as defined in claim 1 wherein said conducting layer is a conducting paper.

16. A receptor sheet as defined in claim 1 wherein said antistatic electrical conducting layer has a resistivity in the range of about $10^8$ to about $10^{12}$ ohms per square unit of area.

17. A receptor sheet as defined in claim 1 wherein said conducting layer includes a thin optically substantially transparent layer of metal.

18. A receptor sheet as defined in claim 1 wherein said conducting layer includes a continuous layer of metal in the order of several hundred angstroms thick.

* * * * *